United States Patent
Chasman et al.

(10) Patent No.: US 9,430,536 B2
(45) Date of Patent: Aug. 30, 2016

(54) SYSTEM, METHOD AND COMPUTER PROGRAM PRODUCT FOR CREATING A VISUAL COMPONENT FOR TENANTS OF AN ON-DEMAND DATABASE SERVICE

(71) Applicant: salesforce.com, inc, San Francisco, CA (US)

(72) Inventors: Douglas Chasman, Pittsford, NY (US); K. Andrew Waite, Novato, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/873,126

(22) Filed: Apr. 29, 2013

(65) Prior Publication Data

US 2013/0238605 A1    Sep. 12, 2013

Related U.S. Application Data

(63) Continuation of application No. 12/357,994, filed on Jan. 22, 2009, now Pat. No. 8,468,117.

(60) Provisional application No. 61/022,784, filed on Jan. 22, 2008.

(51) Int. Cl.
*G06F 7/00* (2006.01)
*G06F 17/30* (2006.01)
*G06F 9/44* (2006.01)

(52) U.S. Cl.
CPC .......... *G06F 17/30554* (2013.01); *G06F 8/34* (2013.01); *G06F 17/30312* (2013.01); *G06F 17/30592* (2013.01)

(58) Field of Classification Search
CPC ................... G06F 17/30312; G06F 17/30594
USPC ........................................................ 707/601
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,980,096 A * | 11/1999 | Thalhammer-Reyero |
| 6,092,083 A | 7/2000 | Brodersen et al. |
| 6,141,595 A * | 10/2000 | Gloudeman et al. ........... 700/83 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Mark E Hershley

(74) *Attorney, Agent, or Firm* — Meyertons, Hood, Kivlin, Kowert & Goetzel, P.C.

(57) ABSTRACT

In accordance with embodiments, there are provided mechanisms and methods for creating visual components for tenants of an on-demand database service. These mechanisms and methods for creating visual components for tenants of an on-demand database service can enable embodiments to allow tenants to create reusable components for use in user defined interfaces, etc. The ability of embodiments to provide such feature may allow tenants to efficiently and effectively create interfaces.

19 Claims, 5 Drawing Sheets

(56) References Cited

U.S. PATENT DOCUMENTS

| | | | |
|---|---|---|---|
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,813,777 B1* | 11/2004 | Weinberger et al. | 725/76 |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,617,295 B1* | 11/2009 | Farber et al. | 709/217 |
| 7,620,655 B2 | 11/2009 | Larsson et al. | |
| 7,698,160 B2 | 4/2010 | Beaven et al. | |
| 7,779,039 B2 | 8/2010 | Weissman et al. | |
| 7,823,057 B1* | 10/2010 | Schultz et al. | 715/229 |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0064149 A1* | 5/2002 | Elliott et al. | 370/352 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143727 A1* | 10/2002 | Hu et al. | 707/1 |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0135517 A1* | 7/2003 | Kauffman | 707/103 R |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0231259 A1* | 12/2003 | Yui et al. | 348/564 |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0025110 A1* | 2/2004 | Hu | 715/500 |
| 2004/0027388 A1 | 2/2004 | Berg et al. | |
| 2004/0031058 A1* | 2/2004 | Reisman | 725/112 |
| 2004/0111728 A1* | 6/2004 | Schwalm | 719/316 |
| 2004/0128001 A1 | 7/2004 | Levin et al. | |
| 2004/0128070 A1* | 7/2004 | Schmidt et al. | 701/211 |
| 2004/0139075 A1* | 7/2004 | Brodersen et al. | 707/6 |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0226051 A1* | 11/2004 | Carney et al. | 725/135 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1* | 3/2005 | Weissman et al. | 707/4 |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0031787 A1* | 2/2006 | Ananth et al. | 715/967 |
| 2006/0046686 A1* | 3/2006 | Hawkins et al. | 455/403 |
| 2006/0111878 A1* | 5/2006 | Pendyala et al. | 703/1 |
| 2006/0136582 A1* | 6/2006 | Mills | 709/224 |
| 2006/0156253 A1* | 7/2006 | Schreiber et al. | 715/835 |
| 2006/0184892 A1* | 8/2006 | Morris | G06F 17/30014 715/767 |
| 2006/0206834 A1* | 9/2006 | Fisher et al. | 715/777 |
| 2006/0235831 A1* | 10/2006 | Adinolfi et al. | 707/3 |
| 2006/0290817 A1* | 12/2006 | Yui et al. | 348/564 |
| 2007/0050467 A1* | 3/2007 | Borrett et al. | 709/213 |
| 2007/0118540 A1* | 5/2007 | Guo | 707/100 |
| 2007/0118844 A1* | 5/2007 | Huang et al. | 719/330 |
| 2007/0168465 A1* | 7/2007 | Toppenberg et al. | 709/218 |
| 2007/0192465 A1* | 8/2007 | Modarressi | 709/223 |
| 2007/0239687 A1* | 10/2007 | Seymour | G06F 17/30038 |
| 2008/0071825 A1* | 3/2008 | Guo | 707/103 R |
| 2008/0080689 A1* | 4/2008 | Casalaina et al. | 379/142.15 |
| 2008/0162491 A1* | 7/2008 | Becker et al. | 707/10 |

(56) References Cited

U.S. PATENT DOCUMENTS

| | | | |
|---|---|---|---|
| 2008/0184119 A1* | 7/2008 | Eyal et al. | 715/719 |
| 2008/0209503 A1* | 8/2008 | Hess et al. | 726/1 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0109959 A1* | 4/2009 | Elliott et al. | 370/352 |
| 2009/0113031 A1* | 4/2009 | Ruan et al. | 709/223 |
| 2009/0177744 A1 | 7/2009 | Marlow et al. | |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |

* cited by examiner

SYSTEM, METHOD AND COMPUTER PROGRAM PRODUCT FOR CREATING A VISUAL COMPONENT FOR TENANTS OF AN ON-DEMAND DATABASE SERVICE

CLAIM OF PRIORITY

This application is a continuation of U.S. application Ser. No. 12/357,994, filed Jan. 22, 2009, which claims the benefit of U.S. Provisional Patent Application No. 61/022,784, filed Jan. 22, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to on-demand services, and more particularly to creating visual objects for tenants of such systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to allow users to generate and edit user interfaces using information associated with the foregoing database frameworks. However, generating and editing these interfaces requires access to component information associated with such interfaces. In general, the component information is limited to information included in a library maintained and provided by the provider of the database service. This restricts the ability of users to efficiently and effectively edit and generate interfaces that fit the needs of the users.

BRIEF SUMMARY

In accordance with embodiments, there are provided mechanisms and methods for creating visual components for tenants of an on-demand database service. These mechanisms and methods for creating visual components for tenants of an on-demand database service can enable embodiments to allow tenants to create reusable components for use in user defined interfaces, etc. The ability of embodiments to provide such feature may allow tenants to efficiently and effectively create interfaces.

In an embodiment and by way of example, a method is provided for creating visual components for tenants of an on-demand database service. In use, a first command to define a component for a user interface is received from a first tenant of a plurality of tenants using at least one on-demand service. Additionally, at least one instruction to a user interface controller to access a portion of storage associated with the first tenant is received. Furthermore, information associated with the portion of storage is processed. Still yet, a result of the processing is returned to the component.

While the present invention is described with reference to an embodiment in which techniques for creating visual components for tenants of an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for creating visual components for tenants of an on-demand database service.

There is often a desire to allow users to generate and edit user interfaces using information associated with the foregoing database frameworks. However, generating and editing these interfaces requires access to component information associated with such interfaces. In general, the component information is limited to information included in a library maintained and provided by the provider of the database service. This restricts the ability of users to efficiently and effectively edit and generate interfaces that fit the needs of the users.

Thus, mechanisms and methods are provided herein for creating visual components for tenants of an on-demand database service and can enable embodiments to allow tenants to efficiently and effectively create interfaces, etc. The ability of embodiments to provide such feature may lead to a more efficient generation of user interfaces by tenants of on-demand services.

Next, mechanisms and methods for creating visual components for tenants of an on-demand database service will be described with reference to exemplary embodiments.

Figure 1:
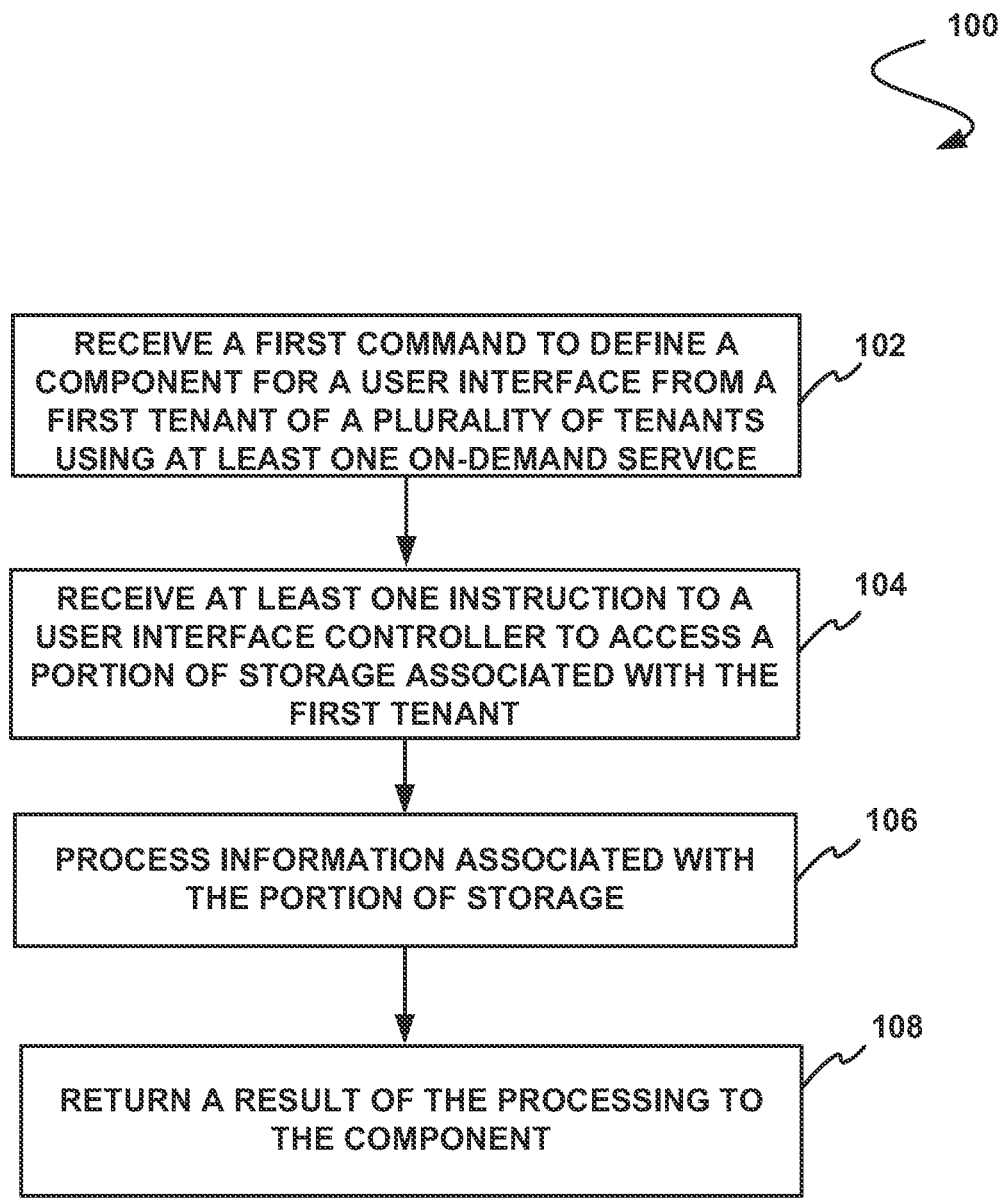
FIG. 1 shows a method for creating visual components for tenants of an on-demand database service, in accordance with one embodiment.

FIG. 1 shows a method 100 for creating visual components for tenants of an on-demand database service, in accordance with one embodiment. As shown, a first command to define a component for a user interface is received from a first tenant of a plurality of tenants using at least one on-demand service. See operation 102.

In the context of the present description, an on-demand service refers to any service that that is accessible over a network. In one embodiment, the on-demand service may include an on-demand database service. In this case, an on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Additionally, in the context of the present description, a tenant refers to any user of the on-demand service. For example, in various embodiments, the tenants may include customers, subscribers, developers, and any other users of the on-demand service.

It should be noted that the user interface may include any interface capable of being utilized by a user. For example, in various embodiments, the user interface may include a web page, a web browser, an interface provided in an email, an email template, and/or any other interface capable of being utilized by a user.

Furthermore, a component refers to any item encapsulating at least a definition of one or more visual objects and associated attributes, where the visual objects may be associated with a user interface. For example, in various embodiments, the component may include tags such as HTML, Javapages, and ASP.Net, etc. Additionally, the component may include markup language as well as parameters describing behavior.

As shown further in FIG. 1, at least one instruction to a user interface controller to access a portion of storage associated with the first tenant is received. See operation 104. In this case, the user interface controller may include any controller for controlling the user interface and/or accessing the portion of storage. Furthermore, the user interface controller may include any logic to facilitate such control and/or access.

Once the portion of the storage associated with the first tenant is received, information associated with the portion of storage is processed. See operation 106. Furthermore, a result of the processing is returned to the component. See operation 108.

For example, in one embodiment, the first command may include at least one attribute. The attribute may include any attribute associated with the component, such as an image attribute (e.g. color, size, etc.), a text attribute (e.g. font, size, etc.), and/or any other attribute associated with the component.

In this case, accessing the portion of storage associated with the first tenant may include accessing at least one value of the at least one attribute. Thus, the information associated with the portion of storage that is processed may include the at least one value of the at least one attribute. Subsequently, a result of the processing of the at least one value may be returned back to the component for output.

In this case, the output may include an output to a storage location, an output to a display, an output to a buffer, and an output to various other devices. In one embodiment, the output may include displaying the result of the processing to the first tenant.

In another embodiment, the at least one instruction to the user interface controller to access a portion of storage, or another instruction, may define the component a reusable component. In this case, the instruction defining the component as the reusable component may be stored. For example, the instruction defining the component as the reusable component may be stored in a storage area associated with the first tenant. In this case, the storage area associated with the first tenant may include the portion of storage associated with the first tenant.

In one embodiment, the reusable component may be executed. For example, the execution of the reusable component may be triggered by a second command, different than the first command. In another case, the execution of the reusable component may be triggered by a program initiated command.

As another option, the execution of the reusable component may be triggered by an event. In this case, the event may include an event external to a computing system executing the reusable component. Of course, the event may include any event capable of triggering the execution of the reusable component.

Figure 2:
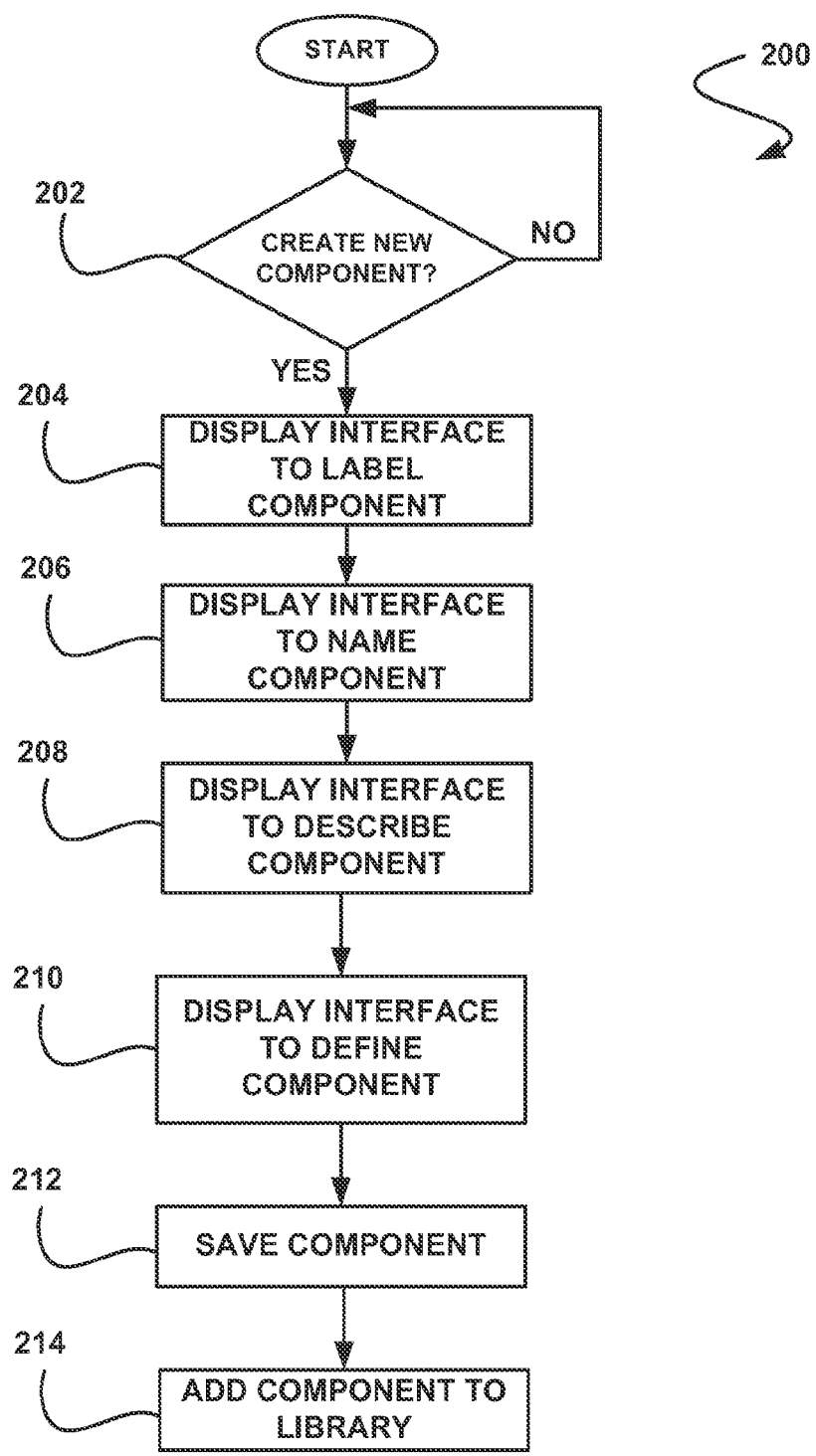
FIG. 2 shows a method for creating a component for use with an interface, in accordance with one embodiment.

FIG. 2 shows a method 200 for creating a component for use with an interface, in accordance with one embodiment. As an option, the present method 200 may be implemented in the context of the functionality of FIG. 1. Of course, however, the method 200 may be carried out in any desired environment. The aforementioned definitions may apply during the present description.

As shown, it is determined whether a command is received to create a new component. See operation 202. For example, in one embodiment, the command may be received at an on-demand database service from a tenant of the on-demand database service. In this case, the tenant of the database service may be presented with a user interface that allows the tenant to select an option to create a new component.

If it is determined that a new component is to be created, an interface is displayed to the tenant for labeling the new component. See operation 204. For example, in one embodiment, a text box may be displayed for labeling the new component. In the label text box, text may be entered that is used to identify the new component in a tools menu, for example.

In addition to the interface for labeling the new component, an interface for naming the new component may be displayed. See operation 206. For example, a text box for naming the new component may be displayed. In the name text box, text may be entered that is used to identify the new component in markup language. In one embodiment, this name may only contain alphanumeric characters, starting with a letter, and may be unique from all other components in an organization (e.g. an organization associated with the tenant, etc.).

An interface for describing the new component may also be displayed. See operation 208. This interface may include a text box for describing the new component. In the description text box, a text description of the new component may be entered. As an option, this description may appear in a component reference library with other standard component descriptions when the new component is saved.

Once the component is labeled and named, an interface for defining the new component is displayed. See operation 210. For example, a text box for inserting body text of the component may be displayed. In the body text box, markup language for the custom component definition may be entered.

It should be noted that any of the aforementioned interfaces and test boxes may be displayed or combined in one interface or may be displayed individually. Once the component is defined, the component may be saved. See operation 212.

In one embodiment, the body text may be examined to determine the validity upon saving the component. In this case, invalid text may result in the component being rejected and a user being prompted to remedy the text. If the text defining the component is valid, the component may then be added to a component library. See operation 214.

In one embodiment, a library of standard, pre-built components (e.g. <apex:relatedList>, <apex:dataTable>, etc.) may be provided to tenants that may be used to develop user interfaces (e.g., web pages, etc.). Thus, the new components may be built to augment this library. These new components may be referred to as custom components as they are tenant developed components.

As an option, a common design pattern may be encapsulated in a custom component such that the component may be reused several times in one or more user interfaces or web pages, etc.

For example, a user may desire to create a photo album using an on-demand service. Each photo in the album may have a unique border, color, and text caption. Rather than repeating the markup language required for displaying every photo in the album, a custom component named "singlePhoto" may be defined that has attributes for image, border color, and caption. These attributes may be used to display the image on the web page. Once defined, every page (i.e. interface) in an organization may utilize the singlePhoto custom component in the same way as a page may utilize standard components from a library, such as <apex:dataTable> or <apex:relatedList>.

Unlike page templates, which also enable developers to reuse markup language, custom components provide a great deal of power and flexibility. For example, custom components allow developers to define attributes that may be passed into each component. The value of an attribute may then change the way the markup language is displayed on a final page, and may also change controller-based logic that executes for that instance of the component.

This behavior differs from that of templates, which do not have a way of passing information from the page that uses a template to the definition of the template itself. Additionally, custom component descriptions may be displayed in a component reference dialog of an application, alongside standard component descriptions. Template descriptions, on the other hand, may only be referenced through a setup area/menu because they are defined as pages.

In one embodiment, all markup language for a custom component may be defined within an <apex:component> tag. This tag may be the top-level tag in a custom component definition.

It should be noted that the <apex:component> tag may include a variety of attributes. For example, an "access" attribute may be provided for indicating whether the component can be used outside of any page in the same namespace as the component. In this case, possible values may include "public" access and "global" access. The global value may be used to indicate the component can be used outside of the namespace of the component.

In one embodiment, to use a custom component in a page, the name of the component may be prefixed with the namespace in which the component was defined. For example, if a component named "myComponent" is defined in a namespace called "myNS," the component may be referenced in a page as <myNS:myComponent>.

As an option, for ease of use, a component that is defined in the same namespace as an associated page may also use a "c" namespace prefix. Consequently, if the page and component from the example above are defined in the same namespace, the component may be referenced as <c:myComponent>.

In one embodiment, apart from standard markup language, the body of an <apex:component> tag may also specify the attributes that can be passed in to the custom component when it is used in a page. The values of such attributes may then be used directly in the component, or within the controller of the component, if applicable.

As an option, attributes may be defined with the <apex:attribute> tag. The <apex:attribute> tag may require values for its name, description, and type attributes. In this case, the name attribute may define how the custom attribute may be referenced in pages.

The value for this attribute may be unique from the names of all other attributes defined in the component. The description attribute may define the help text for the attribute that appears in the component reference library once the custom component has been saved. The custom component may be listed in the reference library with the standard components that are also available. In one embodiment, the type attribute may define the Apex data type of the attribute.

As an option, the values of the data types may be limited. For example, in one embodiment, the values of the data types may be limited to primitives (e.g. string, integer, or Boolean, etc.), sObjects (e.g. Account, My_Custom_Object_c, or the generic sObject type, etc.), one-dimensional lists specified using array-notation (e.g. String[ ], or Contact[ ], etc.), and custom Apex classes.

In one embodiment, custom components may be associated with a controller written in Apex. This association may be made by setting a controller attribute included in the component to a custom controller. The controller may also be used to perform additional logic before returning the markup language of the component to the associated page.

To access the value of a custom component attribute in an associated custom component controller, a class variable in the custom component controller may be defined to store the value of the attribute, and a setter technique for the class variable may be defined. In the <apex:attribute> tag in the component definition, an "assignTo" attribute may be used to bind the attribute to the class variable that was defined.

In another embodiment, a custom component may be created in development mode by adding a reference to a custom component that does not yet exist to page markup language. After saving the markup language, a quick fix link may appear that allows the creation of a new component definition (including any specified attributes) based on the name provided for the component.

In one embodiment, any created pages, components, or custom controllers may be included in an application that is to be exchanged. In this case, the content of a page in a managed package may not be hidden when the package is installed. However, as an option, custom controllers, controller extensions, and custom components may be hidden. In addition, custom components may be restricted, using the access attribute, to run only in a specified namespace.

Figure 3:
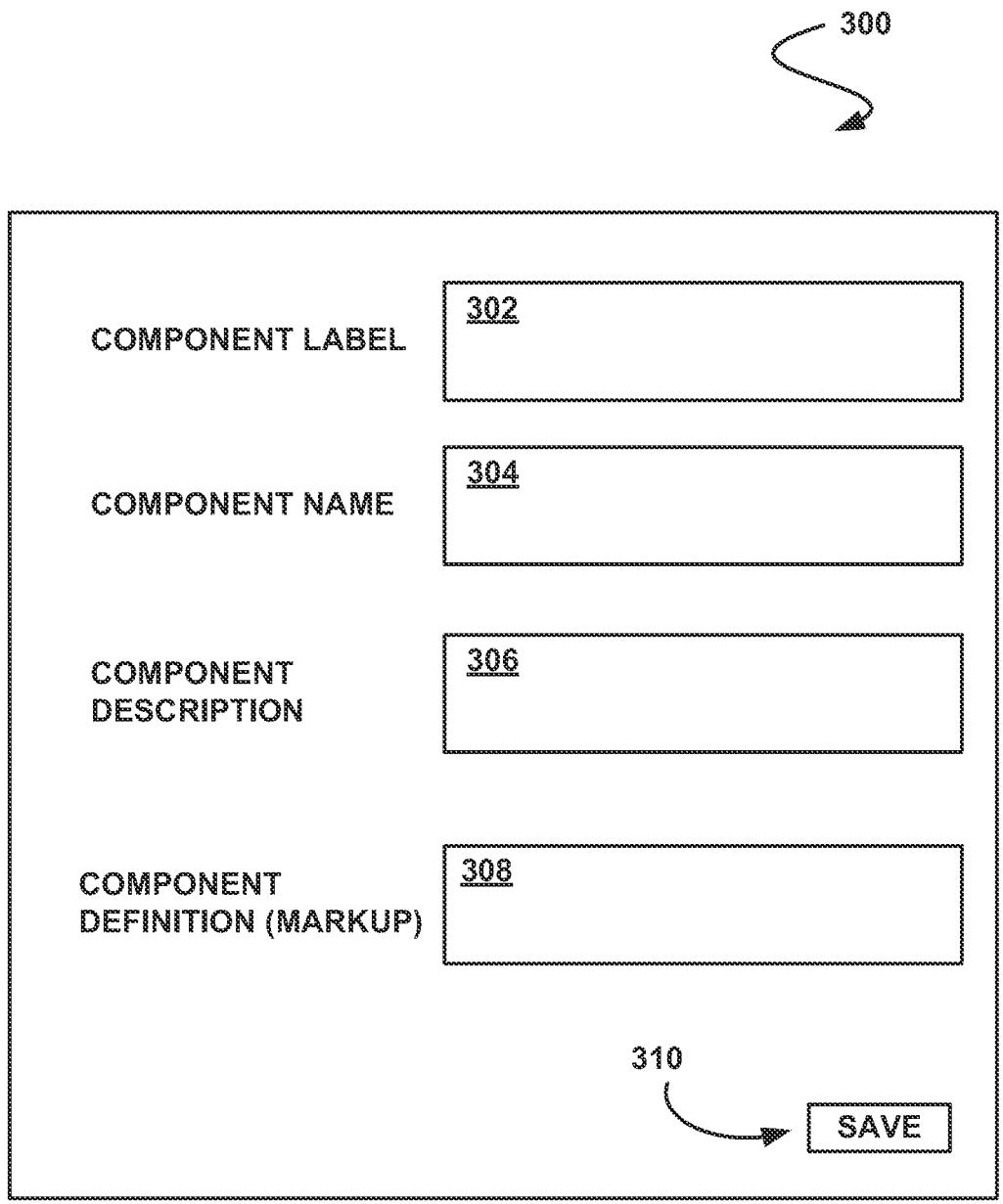
FIG. 3 shows a user interface for creating a component for use with an interface, in accordance with one embodiment.

FIG. 3 shows a user interface 300 for creating a component for use with an interface, in accordance with one embodiment. As an option, the user interface 300 may be implemented in the context of the functionality of FIGS. 1-2. Of course, however, the user interface 300 may be implemented in any desired environment. Again, the aforementioned definitions may apply during the present description.

As shown, the user interface 300 includes a component label text box 302, a component name text box 304, a component description text box 306, a component definition text box 308, and a save button 310. In operation, a developer may utilize the user interface to create a component for use with an interface, such as a web page, etc.

For example, Apex pages may materialize to a user through a browser by virtue of an HTML rendering. In this case, components may produce HTML. One approach for component authoring is to encapsulate markup language with a component definition in a manner consistent with creating a basic page.

Similar to componentization of code into discreet re-usable elements, user interface elements may be broken down into re-usable components that are used by developers with their respective tags to construct a user experience. A developer may create similar structures or may simply use standard components in a very similar way in a number of pages. The developer may like to materialize a reusable component in the same way the standard components of a library are provided. A custom component may have all the capabilities of a standard component with respect to how it is consumed and utilized by the developer using it, versus or in addition to standard components.

One difference between a component and a page is that a controller of a component may be limited and interactions with the database may be handled using pass through attribute definitions. In some cases, classes associated to component definitions may only access data that is passed into the component through attributes of the component and may not necessarily directly query or execute DML operations.

As an option, such actions may be handled by a controller of a consumer and may be exposed as action attributes on the component. Data supplied to the component using the attributes may, in turn, be used by the page directly or by the Apex class associated to the component.

As an example, a developer may desire to create a component that generates a sorted list of text values using a custom component. First, the component may need to define an attribute for the collection of strings to sort and output in the page. The controller may then need to access the value of this attribute, sort the collection, and return the sorted values back to the component for output.

In one embodiment, values passed into the component implementation by the consumer through the attributes of the component may be accessible from the controller of the component by defining an appropriate setter for the attribute and binding it through an "assignTo" attribute.

For example, Table 1 shows an attribute definition in the component markup language, in accordance with one embodiment.

TABLE 1

<apex:attribute name="value" type="String" required="true" assignTo="{!value}"/>

Table 2 shows an Apex class associated to the component, in accordance with one embodiment.

TABLE 2 class myComponentController {
String value;
public void setValue(String s) { value = s; }
}

Accessing the same value from within the component markup language may be the same as though there is a getter in the component controller. Table 3 shows an attribute definition in the component markup language, in accordance with another embodiment.

TABLE 3

<apex:attribute name="value" type="String" required="true"/>
<apex:outputText value="{!value}"/>

In various embodiments, getters for value bindings in component markup language may support either an attribute component tag, as in the example above, or a traditional binding to a getter in the Apex controller class. As an option, these binding mechanisms may be mutually exclusive binding mechanisms for which there may be a compile time check upon saving of the component markup language.

In one embodiment, when a component is saved, one or more validations may occur. For example, in various embodiments, these validations may include verifying that attribute types are defined types or primitives, verifying that value binding expressions are supported by the appropriate items in the controller class of the component, verifying that a getter method or an attribute tag is defined for a value binding expression, and verifying that the name of the component is unique in the given namespace.

In some cases, there may be specific issues with components that require either being a descendent in a tree from a form, or that require that they are not a descendent of a form. In this case, when compiling a component, the typical page validation that asserts there is a form may be skipped so a component with inputs may be plugged into a page with an existing form.

Because components may be used within pages, a dependency may exist between a custom component and any pages that utilize the component. In one embodiment, a component detail page may include a "Where is this used?" button that may present the list of pages that are currently dependent on the component.

As an option, custom components may appear in the component reference library as soon as they are created. In one embodiment, development of components may occur in a separate organization (e.g. in a sandbox, etc.) and may be deployed to a production environment by virtue of either packaging or a metadata API. Additionally, a custom component may have the ability to support all the reference features that standard components implement.

After a component has been defined, it may then be used in any page based on the access defined on the component. For example, Table 4 shows a component definition in accordance with one embodiment.

TABLE 4

```
<apex:component name="orderedList" description="This component takes
        a collection of strings and outputs it into an ordered list"
        access="public">
<apex:attribute name="value" type="List<String>"/>
<ol>
<apex:repeat value="{!value}" var="s">
<li>{!s}</li>
</apex:repeat>
</ol>
</apex:component>
```

The optional component definition illustrated in Table 4 may be used within the same namespace with the markup language shown in Table 5, in accordance with one embodiment.

TABLE 5

```
<c:orderedList value="{!mystrings}"/>
```

As another exemplary implementation of creating components, a user may desire to output a pre-ordered set of contact names. In this case, it may be expected that the consumer provides the list of contact records in the desired order.

Table 6 shows markup language that may be used by the user to include this component in a page of the user.

TABLE 6

```
<c:orderedList value="{!mycontacts}"/>
```

The component definition in this case may change from the example above simply by altering the attribute type and the output expression. Table 7 shows an example of this alteration, in accordance with one embodiment.

TABLE 7

```
<apex:component name="orderedList" description="This component takes
a collection of contacts and outputs the names into an ordered list"
access="global">
<apex:attribute name="value" type="List<Contact>"/>
<ol>
<apex:repeat value="{!value}" var="c">
<li><apex:outputText value="{!c.name}"/></li>
</apex:repeat>
</ol>
</apex:component>
```

In this example, instead of the component defining the output of each element in the collection, the user may be afforded that decision by use of the body of the component tag. Table 8 shows an example of this definition, in accordance with one embodiment.

TABLE 8

```
<c:orderedList value="{!mycontacts}" var="c">
<b><apex:outputText value="{!c.name}"/></b>
</c:orderedList>
```

The component definition may thus need to utilize the componentBody tag as shown in Table 9.

TABLE 9

```
<apex:component name="orderedList" description="This component takes
a collection of contacts and outputs what the user specified in the body
of the tag into an ordered list" access="global">
<apex:attribute name="var"/>
<apex:attribute name="value" type="List<Contact>"/>
<ol>
<apex:repeat value="{!value}" var="v">
<li>
<apex:componentBody>
<apex:variable var="{!var}" value="{!v}"/>
</apex:componentBody>
</li>
</apex:repeat>
</ol>
</apex:component>
```

In this example, it may be assumed that the collection of contacts passed into the component was not ordered. In this case, the markup of the user may not change from the previous example. The component definition may change slightly with the addition of an Apex class and binding to the appropriate accessors in that class, as shown in Table 10.

TABLE 10

```
public class myComponentCon {
List<Contact> contactList;
public void setValues(List<Contact> cList) { this.contactList = cList; }
public List<Contact> getOrderedValue( ) {
List<Contact> orderedList = new List<Contact>( );
//do sorting
return orderedList;
}
}
<apex:component name="orderedList" description="This component takes
a collection of contacts and outputs what the user specified in the body
of the tag into an ordered list"access="global"
controller="myComponentCon">
<apex:attribute name="var"/>
<apex:attribute name="value" type="List<Contact>"
assignTo="{!values}"/>
<ol>
<apex:repeat value="{!orderedValue}" var="v">
<li>
<apex:componentBody>
<apex:variable var="{!var}" value="{!v}"/>
</apex:componentBody>
</li>
</apex:repeat>
</ol>
</apex:component>
```

It should be noted that this above tables illustrate code depicting exemplary implementations of the techniques described herein and should not be construed as limiting in any manner.

System Overview

Figure 4:
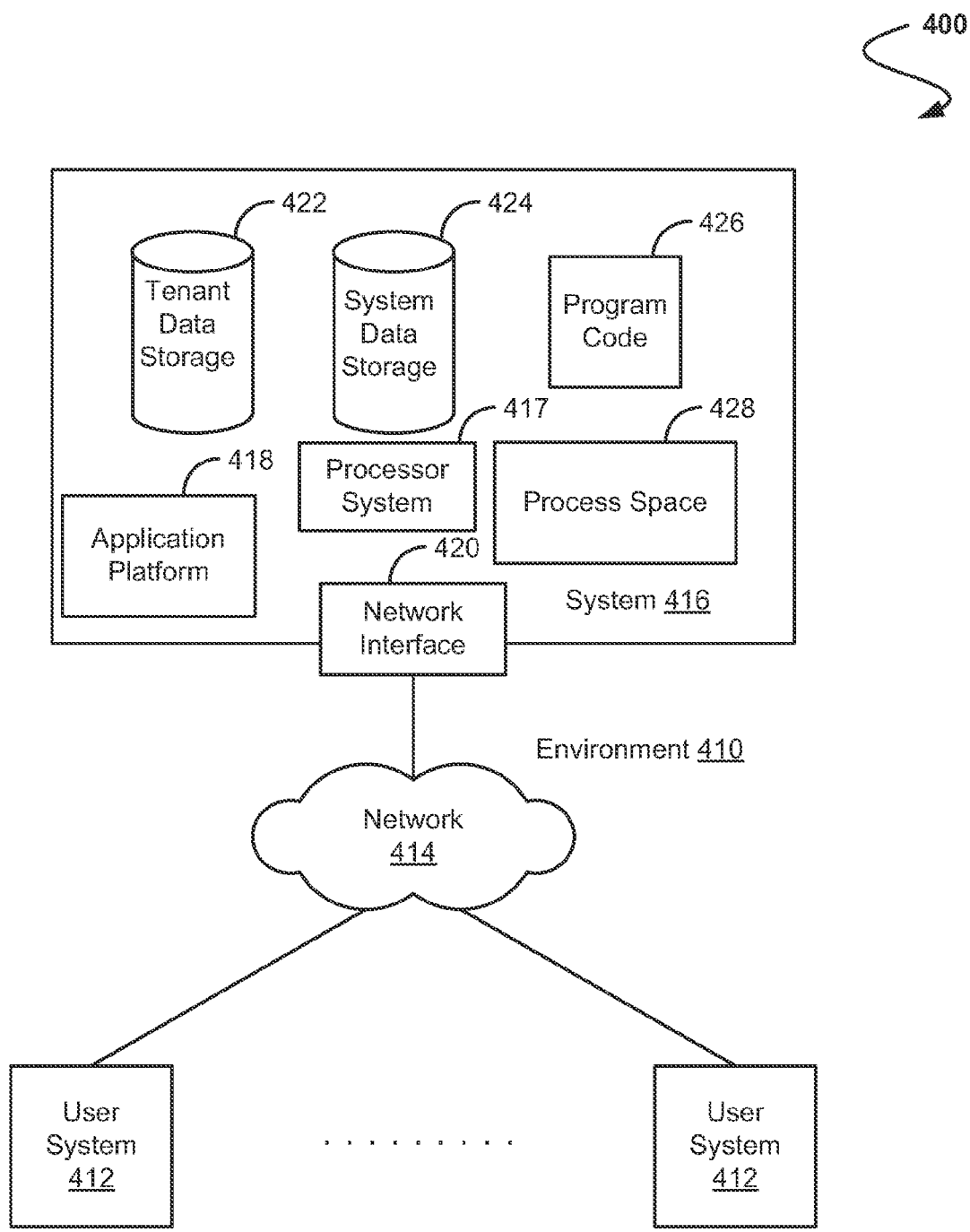
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein, A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
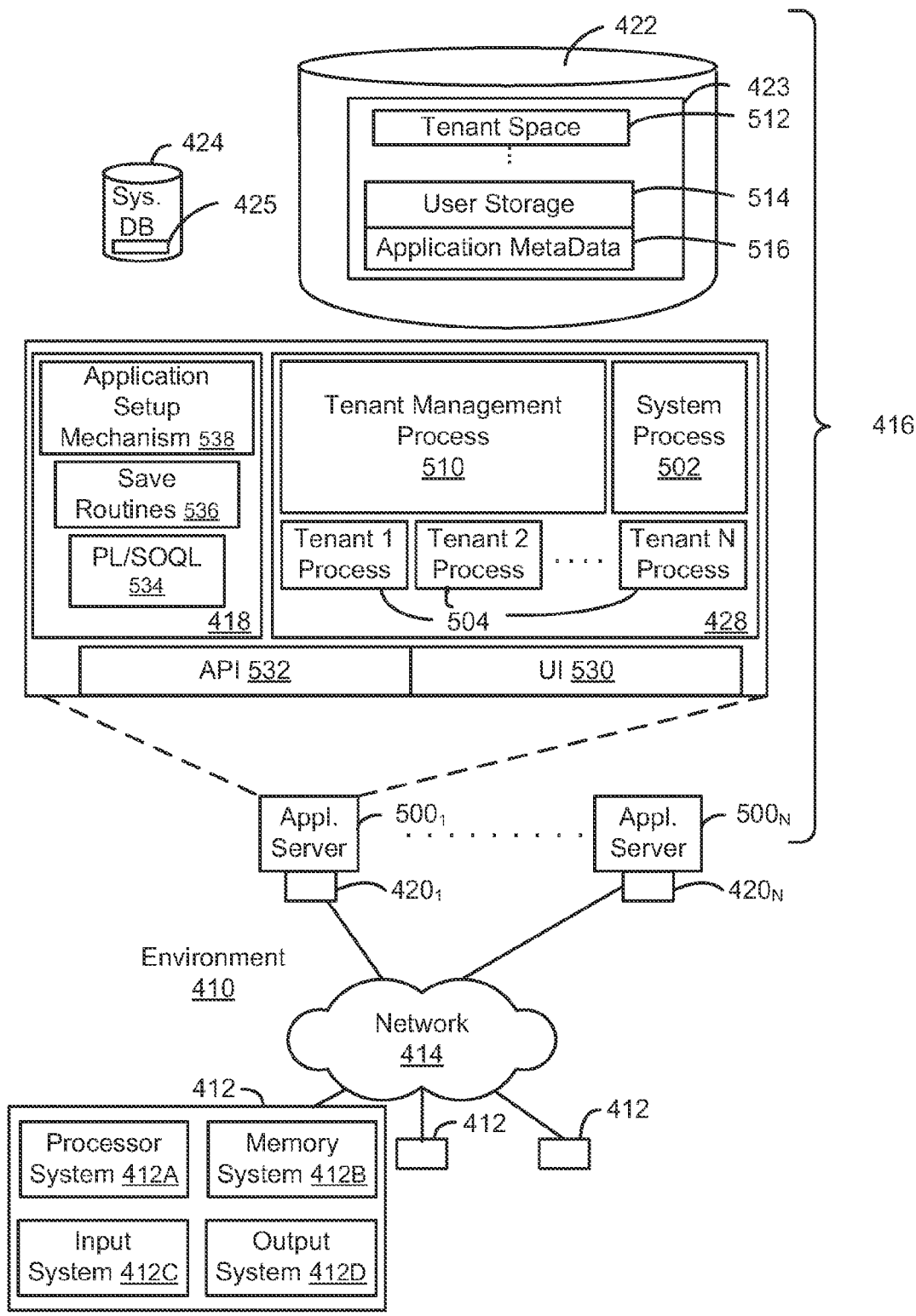
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, ca phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GU( ) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (MID), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each NITS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530. Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g. one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in U.S. patent application Ser. No. 12/174,975, titled "SYSTEM, METHOD AND COMPUTER PROGRAM PRODUCT FOR EDITING AN ON-DEMAND DATABASE SERVICE GRAPHICAL USER INTERFACE," filed Jul. 17, 2008, which is incorporated herein by reference in its entirety for all purposes; or one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
storing, by an on-demand database system, a definition of a component for displaying a visual object within user interfaces, wherein the definition includes a first value for a configurable attribute that affects a manner in which the visual object is displayed within the user interface, and wherein the definition of the component is stored with a plurality of other components in a component library of the on-demand database system that is accessible by a plurality of users of the on-demand database system;

receiving, at the on-demand database system, a request to modify the configurable attribute of the component for a first user of the plurality of users to have a second value different from the first value;
storing, by the on-demand database system, the second value separately from the component library in a storage portion within the on-demand database system associated with the first user; and
in response to a request, to the on-demand database system, to render a user interface for the first user that includes the component:
accessing, by the on-demand database system the storage portion associated with the first user that stores the second value; and
returning, by the on-demand database system, the second value to the component such that the component can be displayed according to the second value of the configurable attribute.

2. The method of claim 1, wherein the visual object is displayed within the user interface to the first user.

3. The method of claim 1, further comprising receiving at least one instruction that defines the component as a reusable component.

4. The method of claim 3, further comprising executing the reusable component, wherein the reusable component is executable.

5. The method of claim 4, wherein the execution of the reusable component is triggered by a command.

6. The method of claim 4, wherein the execution of the reusable component is triggered by a program initiated command.

7. The method of claim 4, wherein the execution of the reusable component is triggered by an event.

8. The method of claim 1, further comprising validating, by the on-demand database system, the definition of the component, wherein the definition is required to be validated in order to utilize the component for displaying the visual object within the user interface.

9. The method of claim 8, wherein the validating includes verifying that a name of the component is unique in a given namespace.

10. The method of claim 1, wherein when the component is defined as a reusable component.

11. The method of claim 1, wherein the user interface is a web page.

12. The method of claim 1, wherein the definition of the component includes a design pattern common to a plurality of visual objects within the user interface.

13. The method of claim 12, wherein the user interface is a photo album, and the component is configured to display a photo.

14. The method of claim 1, wherein the definition of the component includes an access attribute having a value indicating whether the component is allowed to be used for a user interface in a different namespace than the component.

15. A non-transitory computer-readable medium having computer instructions stored thereon that are capable of causing operations comprising:
storing a definition of a component for displaying a visual object within user interfaces, wherein the definition includes a first value for a configurable attribute that affects a manner in which the visual object is displayed within the user interface, and wherein the definition of the component is stored with a plurality of other components in a component library of an on-demand database system that is accessible by a plurality of users of the on-demand database system;

receiving a request to modify the configurable attribute of the component for a first user of the plurality of users to have a second value different from the first value;

storing the second value separately from the component library in a storage portion within the on-demand database system associated with the first user; and in response to a request to the on-demand database system to render a user interface for the first user that includes the component:

accessing the storage portion associated with the first user that stores the second value; and returning the second value to the component such that the component can be displayed according to the second value of the configurable attribute.

16. The non-transitory computer-readable medium of claim 15, wherein the configurable attribute is one or more of the following attributes: color, size, font.

17. An apparatus, comprising:

a processor; and a memory coupled to the processor, wherein the memory has computer instructions stored thereon that are capable of causing operations comprising:

storing a definition of a component for displaying a visual object within user interfaces, wherein the definition includes markup language indicating a first value for a configurable attribute that affects a manner in which the visual object is displayed within the user interface, and wherein the definition of the component is stored with a plurality of other components in a component library of an on-demand database system that is accessible by a plurality of users of the on-demand database system;

receiving a request to modify the configurable attribute of the component for a first user of the plurality of users to have a second value different from the first value;

storing the second value separately from the component library in a storage portion within the on-demand database system associated with the first user; and in response to a request to the on-demand database system to render a user interface for the first user that includes the component:

accessing the storage portion associated with the first user that stores the second value; and returning the second value to the component such that the component can be displayed according to the second value of the configurable attribute.

18. The apparatus of claim 17, wherein the operations further comprise receiving, from the first user, a request to edit the component.

19. The apparatus of claim 17, wherein the operations further comprise:

receiving a request to modify the configurable attribute of the component for a second user of the plurality of users to have a third value different from the first value and from the second value; and storing the third value separately from the component library in a storage portion within the on-demand database system associated with the second user.

* * * * *